United States Patent
Griffin et al.

(10) Patent No.: US 12,238,173 B2
(45) Date of Patent: Feb. 25, 2025

(54) USING WIRELESS CHARGING TO REDISTRIBUTE POWER RESOURCES WITHIN A MESH NETWORK

(71) Applicant: Red Hat, Inc., Raleigh, NC (US)

(72) Inventors: Leigh Griffin, Waterford (IE); Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 537 days.

(21) Appl. No.: 17/672,522

(22) Filed: Feb. 15, 2022

(65) Prior Publication Data
US 2023/0262129 A1    Aug. 17, 2023

(51) Int. Cl.
| H04L 67/12 | (2022.01) |
| H02J 7/00 | (2006.01) |
| H02J 7/02 | (2016.01) |
| H04L 12/10 | (2006.01) |

(52) U.S. Cl.
CPC .......... H04L 67/12 (2013.01); H02J 7/00032 (2020.01); H02J 7/0048 (2020.01); H02J 7/02 (2013.01); H04L 12/10 (2013.01)

(58) Field of Classification Search
CPC ...................................... H04L 67/12
See application file for complete search history.

(56) References Cited

U.S. PATENT DOCUMENTS

| 7,941,220 | B2 * | 5/2011 | Tobacman | A61N 1/3708 607/29 |
| 9,313,105 | B2 * | 4/2016 | DeHaan | H04L 63/0823 |
| 9,713,180 | B1 * | 7/2017 | Gupta | H04W 52/0209 |
| 9,894,468 | B2 * | 2/2018 | Brown | H04B 5/48 |
| 10,291,055 | B1 * | 5/2019 | Bell | H02J 50/20 |
| 10,583,303 | B2 * | 3/2020 | Maile | A61N 1/37223 |
| 10,994,149 | B2 | 5/2021 | Perryman et al. | |
| 12,088,469 | B2 * | 9/2024 | Griffin | H04L 41/0893 |

(Continued)

OTHER PUBLICATIONS

Das et al., "A Multiband Antenna Associating Wireless Monitoring and Nonleaky Wireless Power Transfer System for Biomedical Implants", University of Glasgow, IEEE Transactions on Microwave Theory and Techniques, vol. 65, No. 7, Jul. 2017, pp. 2485-2495.

(Continued)

*Primary Examiner* — Drew A Dunn
*Assistant Examiner* — Tynese V McDaniel
(74) *Attorney, Agent, or Firm* — Womble Bond Dickinson (US) LLP

(57) ABSTRACT

A system and method of using wireless charging to redistribute power resources within a mesh network. The method includes monitoring, by a processing device of a control node of the mesh network, a plurality of nodes of the mesh network to obtain a power distribution (PD) report comprising a plurality of battery levels associated with the plurality of nodes. The method includes identifying a first node of the mesh network having a first battery in a first deficit power state based on the PD report. The method includes identifying a second node of the mesh network having a second battery in a second surplus power state based on the PD report. The method includes transmitting a message to the second node of the mesh network to cause the second node to wirelessly charge the first battery of the first node.

19 Claims, 5 Drawing Sheets

(56) References Cited

U.S. PATENT DOCUMENTS

| | | | | |
|---|---|---|---|---|
| 2008/0167531 | A1* | 7/2008 | McDermott | A61N 1/3708 600/300 |
| 2011/0156640 | A1* | 6/2011 | Moshfeghi | H02J 50/12 320/108 |
| 2013/0154558 | A1* | 6/2013 | Lee | H02J 50/80 320/108 |
| 2015/0380973 | A1* | 12/2015 | Scheb | H02J 50/20 320/108 |
| 2016/0323012 | A1* | 11/2016 | Kwon | H04B 1/7143 |
| 2017/0025857 | A1* | 1/2017 | Matthews | H02J 50/80 |
| 2017/0055110 | A1* | 2/2017 | Tian | G06F 3/014 |
| 2017/0093613 | A1* | 3/2017 | Albrecht | H04L 41/0668 |
| 2017/0141583 | A1* | 5/2017 | Adolf | H02J 50/80 |
| 2017/0141584 | A1* | 5/2017 | DeVaul | H02J 50/80 |
| 2018/0006465 | A1* | 1/2018 | Lee | H02J 7/00 |
| 2020/0213389 | A1* | 7/2020 | Elkhail | H04W 4/70 |
| 2020/0367134 | A1* | 11/2020 | Akl | H04W 40/28 |
| 2021/0143681 | A1* | 5/2021 | Farkas | H02J 50/20 |
| 2021/0392708 | A1* | 12/2021 | Kwok | H04W 76/16 |
| 2021/0410003 | A1* | 12/2021 | Shorty | H04W 28/0284 |
| 2022/0131394 | A1* | 4/2022 | AbuGhazaleh | H02J 50/10 |
| 2022/0150154 | A1* | 5/2022 | Pethe | H04L 45/02 |
| 2022/0278929 | A1* | 9/2022 | Drapp | H04W 24/04 |
| 2022/0346022 | A1* | 10/2022 | Butt | H04W 52/0251 |
| 2023/0042164 | A1* | 2/2023 | Xhafa | H02J 7/0048 |
| 2023/0141393 | A1* | 5/2023 | Elshafie | H02J 50/80 307/104 |
| 2023/0232254 | A1* | 7/2023 | Griffin | H04W 24/04 370/216 |
| 2023/0269166 | A1* | 8/2023 | Griffin | H04W 40/24 709/238 |
| 2023/0420992 | A1* | 12/2023 | Yankowitz | H02J 50/90 |
| 2024/0114465 | A1* | 4/2024 | Methenni | H04W 24/10 |

OTHER PUBLICATIONS

Fan et al. "Towards Flexible Wireless Charging for Medical Implants Using Distributed Antenna System", University of Science and Technology of China; Rutgers University; Microsoft; Northwest University; University of Massachusetts Amherst, Alibaba Group, MobiCom '20, Sep. 21-25, 2020.

Xu et al., "Wireless Power Transfer for Miniature Implantable Biomedical Devices", IntechOpen, Oct. 3, 2019, pp. 1-23.

* cited by examiner

300

```
┌─────────────────────────────────────────────┐
│ monitoring, by a processing device of a     │
│ control node of a mesh network, a plurality │
│ of nodes of the mesh network to obtain a    │
│ power distribution (PD) report comprising a │
│ plurality of battery levels associated with │
│ the plurality of nodes                      │
│ 302                                         │
└─────────────────────────────────────────────┘
                      │
                      ▼
┌─────────────────────────────────────────────┐
│ identifying a first node of the mesh network│
│ having a first battery in a first deficit   │
│ power state based on the PD report          │
│ 304                                         │
└─────────────────────────────────────────────┘
                      │
                      ▼
┌─────────────────────────────────────────────┐
│ identifying a second node of the mesh       │
│ network having a second battery in a second │
│ surplus power state based on the PD report  │
│ 306                                         │
└─────────────────────────────────────────────┘
                      │
                      ▼
┌─────────────────────────────────────────────┐
│ transmitting a message to the second node   │
│ of the mesh network to cause the second node│
│ to wirelessly charge the first battery of   │
│ the first node                              │
│ 308                                         │
└─────────────────────────────────────────────┘
```

FIG. 3

USING WIRELESS CHARGING TO REDISTRIBUTE POWER RESOURCES WITHIN A MESH NETWORK

TECHNICAL FIELD

The present disclosure relates generally to software technology, and more particularly, to systems and methods for using wireless charging to redistribute power resources within a mesh network.

BACKGROUND

A mesh network is a network in which devices—or nodes—are linked together, branching off other devices or nodes. These networks are set up to efficiently route data between devices and clients. They help organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram depicting a method for using wireless charging to redistribute power resources within a mesh network, according to some embodiments.

DETAILED DESCRIPTION

Nanotechnology is an emerging technology that has very small devices that can be embedded into living cells and which can control elements of cell function through protein synthesis and message passing. Research here is advancing at a rapid pace and now challenges are emerging about how to monitor the health of the system running inside an organism. One key element of the health of an embedded system is its access to a power source, in other words, the power level of its battery. Bio-embedded devices running low on power could have disastrous consequences ranging from loss of key functionality that is sustaining an action that could impact organ health or even life itself.

Aspects of the present disclosure address the above-noted and other deficiencies by using wireless charging to redistribute power resources within a mesh network. As discussed in greater detail below, a control mesh node of a mesh network executes a power distribution management (PDM) agent, which is a low power monitoring service that is based on the usage of wireless charging via Radio Frequency (RF) signals. The PDM agent of the control mesh node sends RF signals to the mesh nodes of the mesh network to request that they report their battery status (e.g., current battery levels, changes, etc.) back to the control mesh node. The PDM agent is encoded to have key triggers to detect a signal when the battery of a mesh node is under a predefined threshold, as defined by the configurable wireless charging rules that are specific to that mesh node. When the PDM agent detects a mesh node that has a battery in a deficit power state (e.g., where its battery level has gone below a predefined threshold), then the PDM agent analyzes the battery levels of the neighboring mesh nodes that are geographically close enough to wirelessly charge the mesh node and ranks them according to their remaining battery power. The PDM agent sends a targeted message to one or more of the neighboring mesh nodes that have enough surplus power to cause the neighboring mesh nodes to transfer a fixed amount of battery power to the low-powered mesh node; thereby providing redundancy within the mesh network. Furthermore, when the mesh network as a whole goes below a certain power percentage, then the mesh network sends a notification to a computing device (e.g., another mesh network, an administrator device, etc.) outside of the mesh network to request a general recharge of the mesh network. While the embodiments of the present disclosure are described with respect to using RF signaling, they will also work for any Internet of Things (IoT) device with targeted messaging capable through more traditional network calls.

Figure 1:
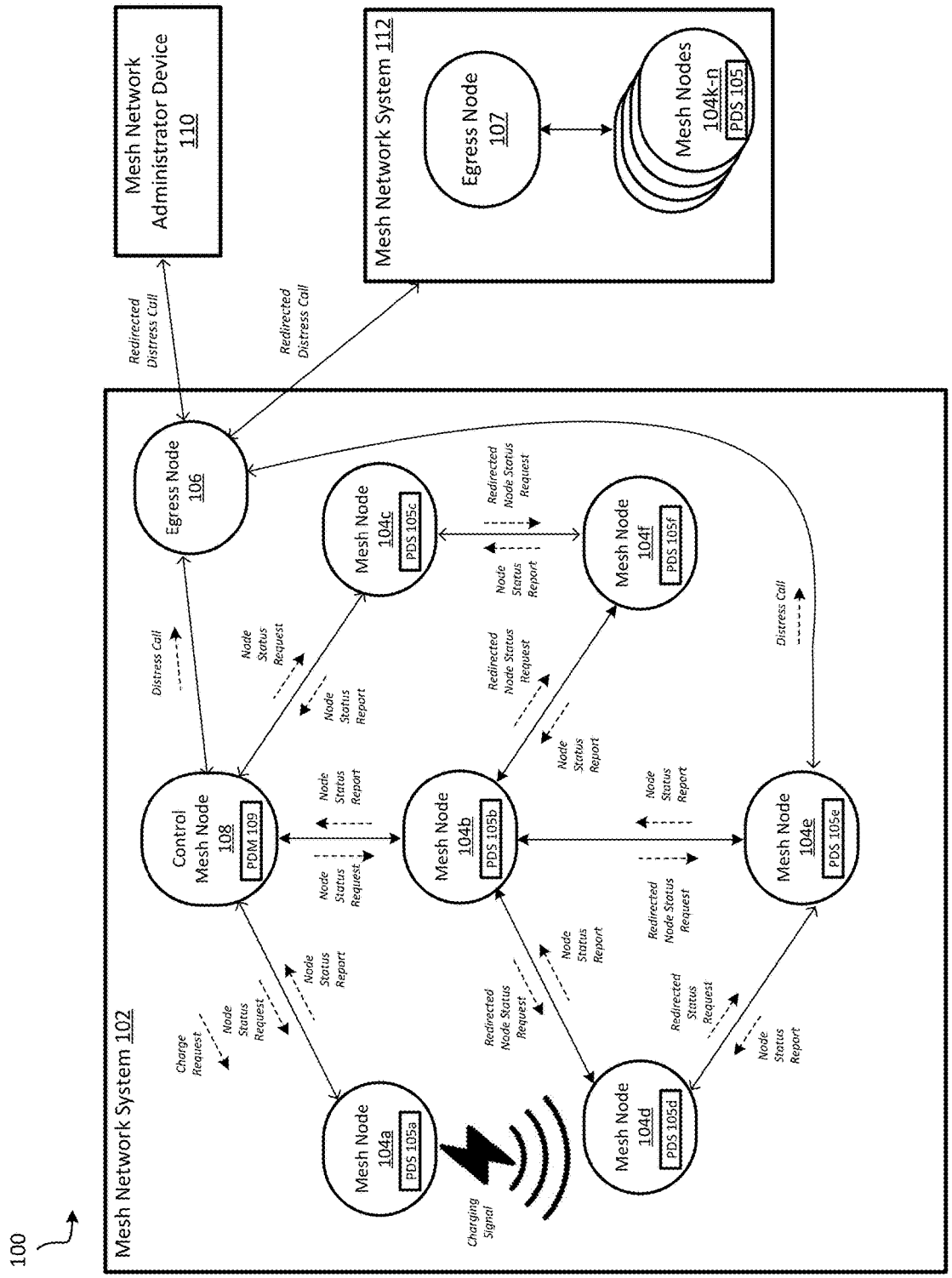
FIG. 1 is a block diagram depicting an example environment for using wireless charging to redistribute power resources within a mesh network, according to some embodiments.

FIG. 1 is a block diagram depicting an example environment for using wireless charging to redistribute power resources within a mesh network, according to some embodiments. The environment 100 includes a mesh network system 102 (sometimes referred to as, "mesh network"), a mesh network system 112, and a mesh network administrator device 110. The mesh network system 102 includes mesh nodes 104 (e.g., mesh nodes 104a, 104b, 104c, 104d, 104e, 104f) and an egress node 106. The mesh network system 102 includes a control mesh node 108 (sometimes referred to as, "control node"), which is a mesh node 104 that is further configured with additional "administrative" functionality for controlling and/or managing the other mesh nodes 104 (including the egress node 106) in the mesh network system 102. The mesh network system 112 includes mesh nodes 104 (e.g., mesh nodes 104k, mesh nodes 104l, mesh nodes 104m, mesh nodes 104n) and an egress node 107. The egress node 106 of the mesh network system 102 is communicably coupled to the mesh network administrator device 110 and the egress node 107 of the mesh network system 112 via an external network (not shown in FIG. 1).

Each of the mesh nodes 104 execute a power distribution service (PDS) agent 105. Specifically, the mesh node 104a executes a PDS agent 105a, the mesh node 104b executes a PDS agent 105b, the mesh node 104c executes a PDS agent 105c, the mesh node 104d executes a PDS agent 105d, the mesh node 104e executes a PDS agent 105e, and the mesh node 104f executes a PDS agent 105f. Similarly, each of the mesh nodes 104k-n execute a PDS agent 105.

The PDS agent is configured to discover its neighboring mesh nodes 104 that are within a minimum distance in order to participate in a wireless charging procedure with the PDS agent. The PDS agent of a mesh node 104 (e.g., mesh node 104b) then sends a report (sometimes referred to as, "node status report") to the control mesh node 108, where the report includes details about the mesh node 104 (e.g., mesh node 104*b*) of the PDS agent. For example, the node status report may include the mesh node's identifier (ID), any neighboring mesh node IDs, battery information (e.g., current battery level, maximum battery capacity, battery type, discharging/charging rate, etc.) about the battery of the mesh node 104, wireless charging rules (e.g., definitions for deficit power state, definitions for surplus power state, etc.) for the mesh node 104, and a device type identifier (e.g., insulin pump, smartphone, smartwatch, etc.) of the mesh node 104. The PDS agent then causes the mesh node 104 to wirelessly charge the battery of its neighboring mesh nodes 104 in response to receiving a message from the control mesh node 108 to do so. Alternatively, the mesh node 104 of the PDS agent may be a recipient of a wireless charge from one or more of its neighboring mesh nodes 104 if the neighboring mesh nodes 104 were instructed by the control mesh node 108 to do so.

Each mesh node (e.g., mesh node 104*a*, control mesh node 108, egress node 106, etc.) of a mesh network system (e.g., mesh network system 102, mesh network system 112) is positioned (e.g., arranged, organized) within the mesh network system, such that the mesh node may be within a minimum physical distance (e.g., up to 10 meters with a Bluetooth connection, up to 46 meters with a wireless local area network (WLAN) connection) of neighboring mesh nodes to be able to communicate with its neighboring nodes by using one or more types of communication capabilities.

As shown in FIG. 1, the mesh node 104*a* has neighboring mesh nodes that include mesh nodes 104*d* and control mesh node 108 when using a first type of communication capability (e.g., a Bluetooth, etc.). The mesh node 104*b* has neighboring mesh nodes that include control mesh node 108 and mesh nodes 104*d*, 104*f* when using the first type of communication capability. The mesh node 104*c* has neighboring mesh nodes that include control mesh node 108 and mesh node 104*f* when using the first type of communication capability. The mesh node 104*d* has neighboring mesh nodes that include mesh nodes 104*b*, 104*e* when using the first type of communication capability. The mesh node 104*e* has neighboring mesh nodes that include egress node 106 and mesh nodes 104*b*, 104*d* when using the first type of communication capability. The mesh node 104*f* has neighboring mesh nodes that include mesh nodes 104*b*, 104*c* when using the first type of communication capability.

A mesh node (e.g., mesh node 104*a*, control mesh node 108, egress node 106, etc.) in the mesh network system 102 may have a greater number of neighboring mesh nodes when using a second type of communication capability (e.g., a WLAN connection). For example, the mesh node 104*a* has neighboring mesh nodes that include control mesh node 108 and mesh nodes 104*b*, 104*d* when using the second type of communication capability. The mesh node 104*b* has neighboring mesh nodes that include control mesh node 108 and mesh nodes 104*a*, 104*c*, 104*d*, 104*e*, 104*f* when using the second type of communication capability. The mesh node 104*c* has neighboring mesh nodes that include control mesh node 108, egress node 106, and mesh nodes 104*b*, 104*f* when using the second type of communication capability. The mesh node 104*e* has neighboring mesh nodes that include egress node 106 and mesh nodes 104*b*, 104*d*, 104*f* when using the second type of communication capability.

A mesh node (e.g., mesh node 104*a*, control mesh node 108, egress node 106, etc.) may directly communicate with its neighboring mesh nodes 104 by using one or more types of communication capabilities. A communication capability may include the hardware and/or software resources for communicating via a Bluetooth (BT) connection, a WLAN connection, and/or a near field communication (NFC) connection. In some embodiments, a mesh node 104 includes the hardware and/or software resources for communicating via a cellular network (e.g., LTE, 5G, etc.). In some embodiments, a mesh mode 104 does not include the hardware and/or software resources for communicating via a cellular network (e.g., LTE, 5G, etc.).

In some embodiments, a mesh node (e.g., mesh node 104*a*, control mesh node 108, egress node 106, etc.) may be unable to directly communicate with a non-neighboring mesh node when using a particular communication capability because the non-neighboring node is outside of the radio frequency (RF) range of the particular communication capability. In some embodiments, a mesh node that is unable to directly communicate with a non-neighboring mesh node may indirectly communicate with the non-neighboring node by directly communicating through a neighboring mesh node. For example, if the control mesh node 108 wants to communicate with the mesh node 104*e*, then the control mesh node 108 may send a message (shown in FIG. 1 as, "node status request") to mesh node 104*b* to cause the mesh node 104*b* to redirect (e.g., forward) the message (shown in FIG. 1 as, "redirected node status request") to the control mesh node 108. As another example, if the mesh node 104*e* wants to communicate with the control mesh node 108, then the mesh node 104*e* may send a message (shown in FIG. 1 as, "node status report") to mesh node 104*b* to cause the mesh node 104*b* to redirect the message to the control mesh node 108.

In some embodiments, a mesh node 104 that includes the hardware and/or software resources for communicating via a cellular network (e.g., LTE, 5G, etc.) may directly communicate with an egress node (e.g., egress node 107) of another mesh network system (mesh network system 112) without having to communicate through another mesh node. In some embodiments, a mesh node (e.g., mesh node 104*e*) in the mesh network system 102 that lacks the capability to communicate via a cellular connection is unable to directly communicate with a computing device (e.g., a mesh node, an egress node) of the mesh network system 112. In this instance, the mesh node 104*e* may only indirectly communicate with the computing device (e.g., a mesh node, an egress node) of the mesh network system 112 via the egress node 106 of the mesh network system 102

A mesh node 104 may directly communicate with a group of its neighboring nodes using a first type of communication capability and another group of its neighboring nodes using a second type of communication capability. For example, the mesh node 104*a* may directly communicate with a first group (e.g., mesh node 104*d*, mesh node 104*d*) of its neighboring nodes using one or more Bluetooth connections and a second group (e.g., control mesh node 108) of its neighboring nodes using one or more WLAN connections.

A mesh node 104 is able to wirelessly charge (using its wireless charging hardware/software) the other mesh nodes 104 of the mesh network system 102, so long that the pair of mesh nodes 104 are within a minimum distance of one another. In some embodiments, a pair of mesh nodes 104 may be within the minimum distance for wireless charging if they can also communicate with one another using any of their communication capabilities. For example, mesh nodes 104*b*, 104*f* may participate in a wireless procedure (e.g., where a first mesh node charges the second mesh node) with each other because they can communicate with each other using the first type of communication capability (e.g., Bluetooth). Similarly, mesh nodes 104*b*, 104*c* may participate in a wireless procedure with each other because they can communicate with each other using the second type of communication capability (e.g., WLAN). A pair of mesh nodes 104 that cannot communicate with one another because they are too far apart will also be unable to participate in a wireless charging procedure with one another.

A mesh node 104 may be configured to discover its neighboring mesh nodes 104 by broadcasting a ping message outward using a particular communication capability and identifying the mesh nodes 104 that respond to the ping message as neighboring mesh nodes. In some embodiments, a mesh node 104 may be configured to discover a first groups of its neighboring mesh nodes when using a first type of communication capability, a second group of its neighboring mesh nodes when using a second type of communication capability, and so on.

An external network may be a public network (e.g., the internet), a private network (e.g., a local area network (LAN) or wide area network (WAN)), or a combination thereof. In some embodiments, an external network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g. cell towers), etc. The external network may carry communications (e.g., data, message, packets, frames, etc.) between any other the computing device.

A mesh node 104, an egress node (e.g., egress node 106, egress node 107), and a mesh network administrator device 110 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster).

In some embodiments, the mesh node 104, egress node 106, and the mesh network administrator device 110 may each be a wearable device (e.g., smartwatch, smart clothing, smart glasses, smart jewelry, wearable camera, wireless earbuds, fitness tracker, blood pressure monitor, heart rate monitor, etc.) or an implantable device (e.g., insulin pump, cochlear device, pacemaker, brain simulator, etc.).

Still referring to FIG. 1, the control mesh node 108 executes a power distribution management (PDM) agent 109 that is configured to monitor the battery status of mesh nodes 104 in order to generate (and periodically update) a power distribution (PD) report (sometimes referred to as "Table of Power Percentages") about the mesh nodes 104, which the control mesh node 108 then uses to manage the redistribution of power resources within the mesh network system 102 via wireless charging technology. As discussed in greater detail below, the PDM agent 109 broadcasts a request (shown in FIG. 1 as, "node status request") to one or more mesh nodes (e.g., mesh nodes 104, 104*b*, 104*c*) for their node status reports. The request causes a mesh node 104 that receives the request to generate a node status report that includes the mesh node's identifier (ID), any neighboring mesh node IDs, battery information (e.g., current battery level, maximum battery capacity, battery type, etc.) about the battery of the mesh node 104, wireless charging rules (e.g., rules indicative of a deficit power state, rules indicative of a surplus power state, etc.) for the mesh node 104, and a device type identifier (e.g., insulin pump, smartphone, etc.) of the mesh node 104. A mesh node 104 that receives the request may also redirect the request (shown in FIG. 1, as "redirect node status request") to other mesh nodes 104 in the mesh network system 102 if those mesh nodes 104 did not (or could not) receive the request.

A mesh node 104 can either directly send the node status report to the control mesh node 108, or indirectly send the node status report to the control mesh node 108 by sending the node status report to a second mesh node 104, which causes the second mesh node 104 to redirect (e.g., forward) the node status report to the control mesh node 108. The control mesh node 108 generates the PD report from the node status reports and uses the PD report to identify a mesh node (e.g., mesh node 104*d*) of the mesh network system 102 that has a battery in a deficit power state (e.g., needing a charge). The control mesh node 108 then uses the PD report to identify a neighboring mesh node that is (a) within a minimum distance to wirelessly charge the "distressed" mesh node and (b) has a battery that is in a surplus power state (e.g., capable of providing a charge). The PDM agent then transmits a message (shown in FIG. 1 as, "charge request") to the neighboring node (e.g., mesh node 104*a*) of the mesh network system 102 to cause the neighboring node to drain (e.g., partially or completely) its battery to wirelessly charge the battery of the mesh node (e.g., mesh node 104*d*).

Although FIG. 1 shows only a select number of computing devices (e.g., mesh nodes 104, egress nodes 106, and mesh network administrator device 110), the environment 100 may include any number of computing devices that are interconnected in any arrangement to facilitate the exchange of data between the computing devices.

Figure 2B:
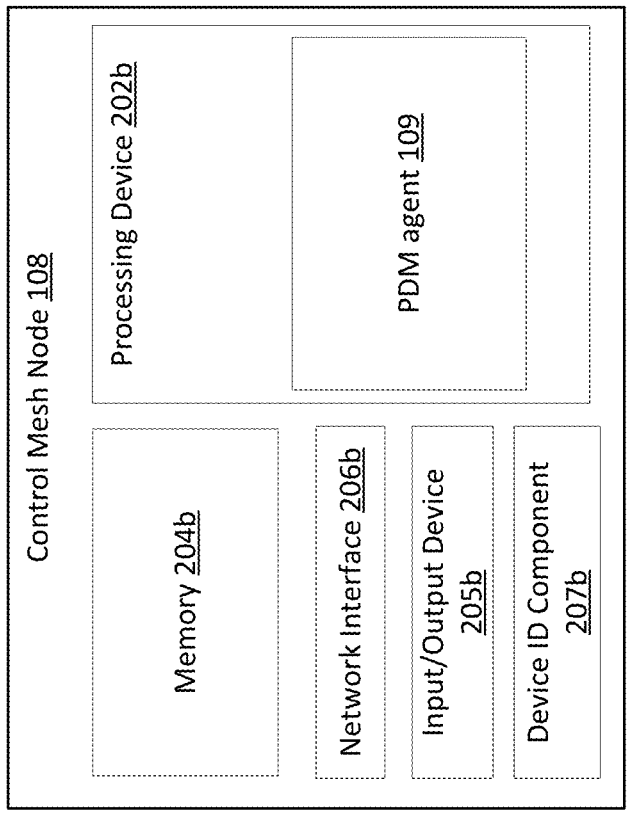
FIG. 2B is a block diagram depicting an example of the control mesh node 108 of the environment in FIG. 1, according to some embodiments.
Figure 2A:
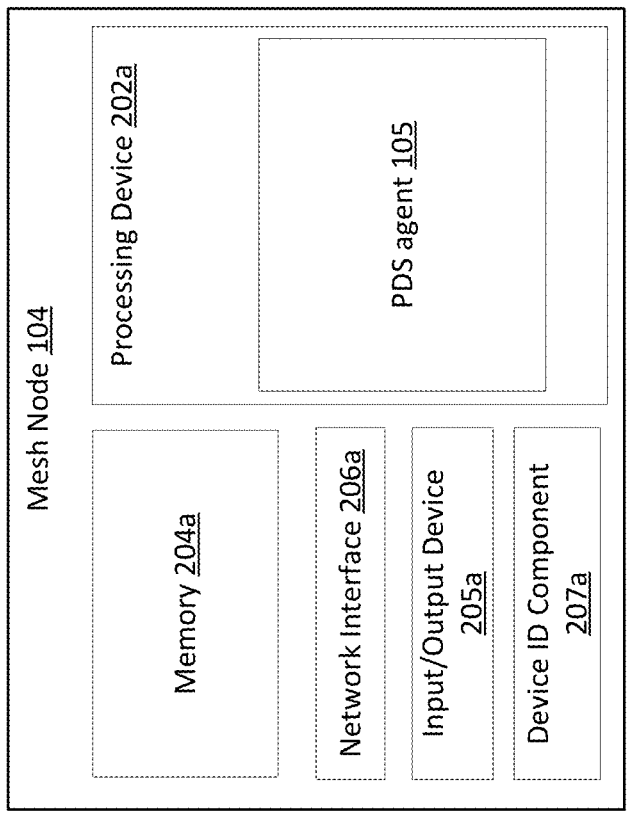
FIG. 2A is a block diagram depicting an example mesh node 104 of the mesh network system 102 in FIG. 1, according to some embodiments.

FIG. 2A is a block diagram depicting an example mesh node 104 of the mesh network system 102 in FIG. 1, according to some embodiments. While various devices, interfaces, and logic with particular functionality are shown, it should be understood that the one or more mesh nodes 104 (e.g., mesh nodes 104*a-f*) of the mesh network system 102 and the one or more mesh nodes 104 (e.g., 104*k-n*) of the mesh network system 112 each include any number of devices and/or components, interfaces, and logic for facilitating the functions described herein. For example, the activities of multiple devices may be combined as a single device and implemented on a same processing device (e.g., processing device 202*a*), as additional devices and/or components with additional functionality are included.

The mesh node 104 includes a processing device 202*a* (e.g., general purpose processor, a PLD, etc.), which may be composed of one or more processors, and a memory 204*a* (e.g., synchronous dynamic random access memory (DRAM), read-only memory (ROM)), which may communicate with each other via a bus (not shown).

The processing device 202*a* may be provided by one or more general-purpose processing devices such as a microprocessor, central processing unit, or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202*a* may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the mesh node 104. In some embodiments, the processing device 202a and the memory 204a form various processing devices and/or circuits described with respect to the mesh node 104. The instructions include code from any suitable computer programming language such as, but not limited to, C, C++, C #, Java, JavaScript, VB Script, Perl, HTML, XML, Python, TCL, and Basic.

The processing device 202a may execute a Power Distribution Service (PDS) agent 105 that is configured to discover its neighboring mesh nodes 104 that are within a minimum distance (e.g., meters) in order to participate in a wireless charging procedure with the PDS agent. The PDS agent 105 may be configured to discover its neighboring mesh nodes by broadcasting a ping message outward using a particular communication capability and identifying the mesh nodes 104 that respond to the ping message as neighboring mesh nodes. The PDS agent 105 may be configured to discover a first group of its neighboring mesh nodes when using a first type of communication capability (e.g., Bluetooth), a second group of its neighboring mesh nodes when using a second type of communication capability (e.g., NFC), and so on.

The PDS agent 105 of a mesh node 104 may be configured to determine whether it is able to wirelessly charge (using its wireless charging hardware/software) one of its neighboring mesh nodes. For example, the PDS agent 105 may determine that it is able to wirelessly charge its neighboring node if the PDS agent 105 determines that it is able to wirelessly communicate with the mesh node using at least one communication capability (e.g., Bluetooth, WLAN, etc.). Alternatively, the PDS agent 105 may determine that it is unable to wirelessly charge its neighboring node if the PDS agent 105 determines that it is unable to wirelessly communicate with the mesh node using any of its communication capabilities (e.g., Bluetooth, WLAN, etc.).

The PDS agent 105 of a mesh node 104 may be configured to receive a request (shown in FIG. 1 as, "node status request") for a node status report from the control mesh node 108. The PDS agent 105 of the mesh node 104 may generate and transmit the node status report to the control mesh node 108. The node status report includes the mesh node's identifier (ID), any neighboring mesh node IDs, battery information (e.g., current battery level, maximum battery capacity, battery type, discharging/charging rate, etc.) about the battery of the mesh node 104, wireless charging rules (e.g., definitions for deficit power state, definitions for surplus power state, etc.) for the mesh node 104, and a device type identifier (e.g., insulin pump, smartphone, smartwatch, etc.) of the mesh node 104.

The mesh node ID is a unique value that the control mesh node 108 generates and assigns to each mesh node 104 in the mesh network system 102. The control mesh node 108 uses the mesh node ID to keep track of and communicate with each mesh node 104. The current battery level (e.g., 0% to 100%) is equal to the remaining battery power divided by the maximum battery capacity (e.g., milliamp×hours (mAH)). The battery type indicates the battery brand, the battery model, and/or the battery technology (e.g., Lithium-ion (Li-ion), Lithium Cobalt Oxide (LiCoO2), Nickel-cadmium (Ni—Cd), etc.).

The PDS agent 105 is responsible for creating and updating the wireless charging rules for the mesh node 104 of the PDS agent 105. The PDS agent 105 stores the wireless charging rules in a local storage (e.g., memory 204a) on the mesh node 104. A first wireless charging rule may indicate the criteria when the battery of the mesh node 104 is in a deficit power state (e.g., when the battery needs to be charged) and a second wireless charging rule may indicate the criteria when the battery of the mesh node 104 is in a surplus power state (e.g., when the battery is able to provide a charge to another mesh node). For example, a first wireless charging rule for mesh node 104b may indicate that the mesh node 104b is in a deficit power state if its current battery level is below a first predetermined threshold (e.g., 50%), while a second wireless charging rule for mesh node 104b may indicate that mesh node 104b is in a surplus power state if its current battery level is above a second predetermined threshold (e.g., 80%). If the battery is in a surplus power state, then the mesh node 104 is allowed to wirelessly charge one or more of its neighboring mesh nodes 104 if requested by the control mesh node 108. Conversely, if the battery is in a deficit power state, then the mesh node 104 is not allowed to wirelessly charge any of its neighboring mesh nodes 104. In other words, a first mesh node (e.g., mesh node 104b) that has a battery in a deficit power state is not allowed to charge the battery of a second mesh node (e.g., mesh node 104d) because the wireless charging would further drain the battery of the first mesh node 104, which could cause critical functionality of the first mesh node to shut down due to insufficient battery power.

The PDS agent 105 sets the predetermined threshold value for a deficit power state and the predetermined threshold value for a surplus power state, such that the two states do not overlap. For example, PDS agent 105b may create a first wireless charging rule for mesh node 104b that indicates that the mesh node 104b is in a deficit power state if its current battery level is below a first predetermined threshold (e.g., 50%), and a second wireless charging rule for mesh node 104b that indicates that mesh node 104b is in a surplus power state if its current battery level is above a second predetermined threshold (e.g., 80%). In this example, there is a 30% gap between the deficit power state and the surplus power state to ensure that if the mesh node 104b wirelessly charges one of its neighbors and stops charging once its own battery drops to 80%, then the mesh node 104b will not be fall into a deficit power state.

The PDS agent 105 may be configured to receive a request (shown in FIG. 1 as, "charge request") from the control mesh node 108 to wirelessly charge the battery of a neighboring mesh node by draining (e.g., partially or completely) its own battery. The request may indicate the amount (e.g., 0% to 100%) of its own battery that is to be drained during the wireless charging procedure. In response to receiving the request, the mesh node may activate its wireless charging hardware (e.g., radio, antenna, etc.) and transmit a charging signal (shown in FIG. 1 as, "charging signal") toward the neighboring mesh node that needs the charge. The mesh node transmits the charging signal (e.g., continuous or pulse)

until its own battery drops by the amount indicated in the request, at which point, the mesh node deactivates its wireless charging hardware.

The mesh node 104 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the mesh node 104 includes a plurality of network interfaces 206a of different types, allowing for connections to a variety of networks, such as local area networks (public or private) or wide area networks including the Internet, via different sub-networks.

The mesh node 104 includes an input/output device 205a configured to receive user input from and provide information to a user. In this regard, the input/output device 205a is structured to exchange data, communications, instructions, etc. with an input/output component of the mesh node 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the mesh node 104, such as a built-in display, touch screen, microphone, etc., or external to the housing of the mesh node 104, such as a monitor connected to the mesh node 104, a speaker connected to the mesh node 104, etc., according to various embodiments. In some embodiments, the mesh node 104 includes communication circuitry for facilitating the exchange of data, values, messages, and the like between the input/output device 205a and the components of the mesh node 104. In some embodiments, the input/output device 205a includes machine-readable media for facilitating the exchange of information between the input/output device 205a and the components of the mesh node 104. In still another embodiment, the input/output device 205a includes any combination of hardware components (e.g., a touchscreen), communication circuitry, and machine-readable media.

The mesh node 104 includes a device identification component 207a (shown in FIG. 2A as device ID component 207a) configured to generate and/or manage a device identifier associated with the mesh node 104. The device identifier may include any type and form of identification used to distinguish the mesh node 104 from other computing devices. In some embodiments, to preserve privacy, the device identifier may be cryptographically generated, encrypted, or otherwise obfuscated by any device and/or component of mesh node 104. In some embodiments, the mesh node 104 may include the device identifier in any communication (e.g., node status report, redirected node status request) that the mesh node 104 sends to a computing device.

The mesh node 104 includes a bus (not shown), such as an address/data bus or other communication mechanism for communicating information, which interconnects the devices and/or components of mesh node 104, such as processing device 202a, network interface 206a, input/output device 205a, and/or device ID component 207a.

In some embodiments, some or all of the devices and/or components of mesh node 104 may be implemented with the processing device 202a. For example, the mesh node 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example of the control mesh node 108 of the environment in FIG. 1, according to some embodiments. While various devices, interfaces, and logic with particular functionality are shown, it should be understood that the control mesh node 108 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The control mesh node 108 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the control mesh node 108 instead of devices and/or components of the mesh node 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the control mesh node 108 instead of devices and/or components of the mesh node 104.

The processing device 202b may execute a power distribution management (PDM) agent 109 that may be configured to monitor one or more mesh nodes 104 of the mesh node system 102 to obtain a power distribution (PD) report. In some embodiments, the PDM agent 109 may obtain a PD report by broadcasting a request to one or more mesh nodes 104 for a node status report. The request may indicate that the node status report should include the mesh node's identifier (ID), any neighboring mesh node IDs, battery information (e.g., current battery level, maximum battery capacity, battery type, discharging/charging rate, etc.) about the battery of the mesh node 104, wireless charging rules (e.g., definitions for deficit power state, definitions for surplus power state, etc.) for the mesh node 104, and a device type identifier (e.g., insulin pump, smartphone, smartwatch, etc.) of the mesh node 104. The request may cause a mesh node 104 that receives the request to generate the node status report according to the request and transmit the node status report to the control mesh node 108.

In some embodiments, the request may cause a mesh node 104 to propagate the request to other mesh nodes in the mesh node system 102 that have not received the request. For example, mesh node 104b may redirect the request (shown in FIG. 1 as, "redirected node status request") to mesh nodes 104d, 104f to cause them to send their respective node status reports to mesh node 104b, which in turn, causes the mesh node 104b to redirect the node status reports to the control mesh node 108.

The PDM agent 109 may be configured to identify, based on the PD report, a first mesh node of the mesh network system 102 that has a battery in a deficit power state. For example, the PDM agent 109 may extract, from the PD report, a current battery level (e.g., 30%) that is associated with the mesh node 104d. The PDM agent 109 may also extract, from the PD report, a wireless charging rule that indicates that the mesh node 104d is in a deficit power state when its current battery level is below a predetermined threshold value (e.g., 50%). The PDM agent 109 may compare the current battery level (e.g., 30%) to the predetermined threshold value (e.g., 50%) to determine that the battery of the mesh node 104d is in a deficit power state because its current battery level is below the predetermined threshold value.

The PDM agent 109 may be configured to identify, based on the PD report, the amount of extra charge (e.g., power, battery level) that a battery of a mesh node 104 needs to transition (e.g., move, switch) from a deficit power state to a surplus power state. For example, the PDM agent 109 may extract, from the PD report, a wireless charging rule that indicates that the mesh node 104d is in a surplus power state when its current battery level is equal to or above a predetermined threshold value (e.g., 70%). The PDM agent 109 may calculate a difference between the predetermined threshold value (e.g., 70%) and the current battery level (e.g., 30%) to determine that the mesh node 104d needs an extra 40% of charge to transition from a deficit power state to a surplus power state.

Upon determining that mesh node 104d needs wireless charging, the PDM agent 109 may be configured to determine whether any of the neighboring nodes of the mesh node 104d are in a surplus power state. For example, the PDM agent 109 may determine, based on the PD report, that the mesh nodes 104a, 104b, 104e are physically close enough to the mesh node 104d to wirelessly charge the mesh node 104d. The PDM agent 109 may then extract, from the PD report, a current battery level (e.g., 90%) that is associated with the mesh node 104a and a wireless charging rule that indicates that the mesh node 104a is in a surplus power state when its current battery level is equal to or above a predetermined threshold value (e.g., 70%). The PDM agent 109 may compare the current battery level (e.g., 90%) of mesh node 104a to the predetermined threshold value (e.g., 70%) to determine that the battery of the mesh node 104a is in a surplus power state because its current battery level is equal to or above the predetermined threshold value.

The PDM agent 109 may be configured to determine, based on the PD report, the amount of extra charge that a mesh node 104 is permitted to transfer to the battery of another mesh node 104 via a wireless charging procedure, such that the mesh node 104 that is giving up its charge does not transition from a surplus power state to a deficit power state as a result of performing the wireless charging procedure. For example, the PDM agent 109 may calculate a difference between the current battery level (e.g., 90%) of mesh node 104a and the predetermined threshold value (e.g., 70%) that indicates when mesh node 104a is in a surplus power state to determine that mesh node 104a is able to transfer 20% of its battery to the battery of mesh node 104d via a wireless charging procedure.

The PDM agent 109 may be configured to transmit a message to a mesh node 104 to cause the mesh node 104 to wirelessly charge the battery of another mesh node 104. For example, the PDM agent 109 may transmit a message to mesh node 104a to cause the mesh node 104a to send a signal (shown in FIG. 1 as, "charging signal") to mesh node 104d that transfer power from the battery of mesh node 104a to the battery of mesh node 104d. The message may indicate that mesh node 104a is only permitted to transfer a maximum amount (e.g., 20%) of power from its battery to the battery of mesh node 104d. In other words, the control mesh node 108 prevents the mesh node 104a from transferring more power than the maximum amount in order to prevent the mesh node 104a from moving from a surplus power state to a deficit power state as a result of performing the wireless charging procedure.

In some embodiments, the PDM agent 109 may determine, based on the PD report, that power from more than one neighboring mesh node is needed to wirelessly charge the battery of a mesh node 104 in order to transition the mesh node 104 from a deficit power state to a surplus power state. For example, the PDM agent 109 may determine that the mesh node 104d needs an extra 40% of charge to transition from a deficit power state to a surplus power state. The PDM agent 109 may determine, based on the PD report, that mesh node 104a is able to transfer 20% of its battery to the battery of mesh node 104d via a wireless charging procedure and mesh node 104d is able to transfer 20% of its battery to the battery of mesh node 104d via a wireless charging procedure. In response, the PDM agent 109 may transmit a first message to the mesh node 104a to cause the mesh node 104a to transfer up to 20% of its battery to the battery of mesh node 104d via a wireless charging procedure, and a second message to the mesh node 104b to cause the mesh node 104b to transfer up to 20% of its battery to the battery of mesh node 104d via a wireless charging procedure.

In some embodiments, the PDM agent 109 may determine, based on the PD report, that there are multiple neighboring mesh nodes that are capable of wirelessly charging the battery of a mesh node 104 that needs power. The PDM agent 109 may calculate, based on the PD report, the surplus power for each of the neighboring mesh nodes and select the neighboring mesh node with the largest amount of surplus power to wirelessly charge the battery of the mesh node 104 that needs power. In some embodiments, the PDM agent 109 may rank the neighboring mesh nodes based on their amount of surplus power and add this ranking to the PD report for faster decision making when selecting pairs of mesh nodes 104 to participate in a wireless charging procedure.

In some embodiments, the PDM agent 109 may select, based on the PD report, a group (e.g., two or more mesh nodes) of the multiple neighboring mesh nodes to wirelessly charge the mesh node 104, such that the group of mesh nodes each have the same amount of remaining battery power after they each perform the wireless charging procedure. For example, the PDM agent 109 may determine, based on the PD report, that mesh node 104d needs an extra 40% of charge to transition from a deficit power state to a surplus power state. The PDM agent 109 may also determine, based on the PD report, that mesh node 104a has 30% of surplus power and mesh node 104b has 20% of surplus power. Therefore, the PDM agent 109 may decide to transmit a first message to mesh node 104a to cause mesh node 104a to drain 25% of its battery to wirelessly charge the battery of mesh node 104d and a second message to mesh node 104b to cause mesh node 104b to drain 15% of its battery to wirelessly charge the battery of mesh node 104d. After performing the wireless procedures, mesh nodes 104a, 104b will each have 5% of surplus power remaining.

In some embodiments, the PDM agent 109 may decide, based on the PD report, to override (e.g., supersede, overrule) the wireless charging rules of a first mesh node 104 if a second mesh node 104 is in a deficit power state and the second mesh node 104 is a device type that has a higher priority than the device type of the first mesh node 104. For example, the PDM agent 109 may determine that mesh node 104d is in a surplus power state and that mesh node 104a is its only neighboring mesh node 104 that is capable of wirelessly charging the battery of the mesh node 104a. The PDM agent 109 may also determine, based on the PD report, that mesh node 104a is in a deficit power state, and that its wireless charging rules prohibit the mesh node 104a from participating in a wireless charging procedure when its battery is in a deficit power state. However, the PDM agent 109 may decide to instruct (via a charge request) the mesh node 104a to wirelessly charge the mesh node 104d in response to determining (a) that mesh node 104d is an insulin pump and that mesh node 104a is a smartphone and (b) that an insulin pump has a higher priority than the smartphone.

In some embodiments, the PDM agent 109 may determine an inability of the mesh network system 102 to resolve the deficit power state of a battery of a mesh node 104. For example, the PDM agent 109 may determine that there is not enough power in the mesh node system 102 to transition the mesh node 104d from a deficit power state to a surplus power state. As another example, the PDM agent 109 may determine that all the neighboring mesh nodes (e.g., mesh nodes 104a, 104b, 104e) of mesh node 104d are prohibited from wirelessly charging the mesh node 104d because their batteries are in a deficit power state. As another example, the PDM agent 109 may determine that even if the PDM agent 109 override the wireless charging rules of the neighboring mesh nodes and instructs the neighboring mesh nodes (each in a deficit power state) to wirelessly charge the mesh node 104d, the neighboring mesh nodes still do not have enough power to transition the mesh node 104d from a deficit power state to a surplus power state.

In response to determining that the mesh network system 102 cannot resolve the deficit power state of a battery of a mesh node 104, the control mesh node 108 may transmit a distress call to the egress node 106. The distress call may indicate that one or more mesh nodes 104 of the mesh network system are in a deficit power state and need wireless charging. The distress call may include a mesh node ID corresponding to the distressed mesh nodes, the amount of power that the distressed mesh node need to transition from a deficit power state to a surplus power state, and/or any information from the PD report. The egress node 106 may redirect the distress call (shown in FIG. 1 as, "redirected distress call") to the mesh network administrator device 110 and/or the egress node 107 of the mesh network system 112.

The control mesh node 108 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the control mesh node 108 instead of devices and/or components of the mesh node 104.

The control mesh node 108 includes an input/output device 205b configured to receive user input from and provide information to a user. In this regard, the input/output device 205b is structured to exchange data, communications, instructions, etc. with an input/output component of the control mesh node 108. The input/output device 205b includes identical or nearly identical functionality as input/output device 205a in FIG. 2A, but with respect to devices and/or components of the control mesh node 108 instead of devices and/or components of the mesh node 104.

The control mesh node 108 includes a device identification component 207b (shown in FIG. 2B as device ID component 207b) configured to generate and/or manage a device identifier associated with the egress node 106. The device ID component 207b includes identical or nearly identical functionality as device ID component 207a in FIG. 2A, but with respect to devices and/or components of the control mesh node 108 instead of devices and/or components of the mesh node 104.

The control mesh node 108 includes a bus (not shown), such as an address/data bus or other communication mechanism for communicating information, which interconnects the devices and/or components of the control mesh node 108, such as processing device 202b, network interface 206b, input/output device 205b, and/or device ID component 207b.

In some embodiments, some or all of the devices and/or components of control mesh node 108 may be implemented with the processing device 202b. For example, the control mesh node 108 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 2C:
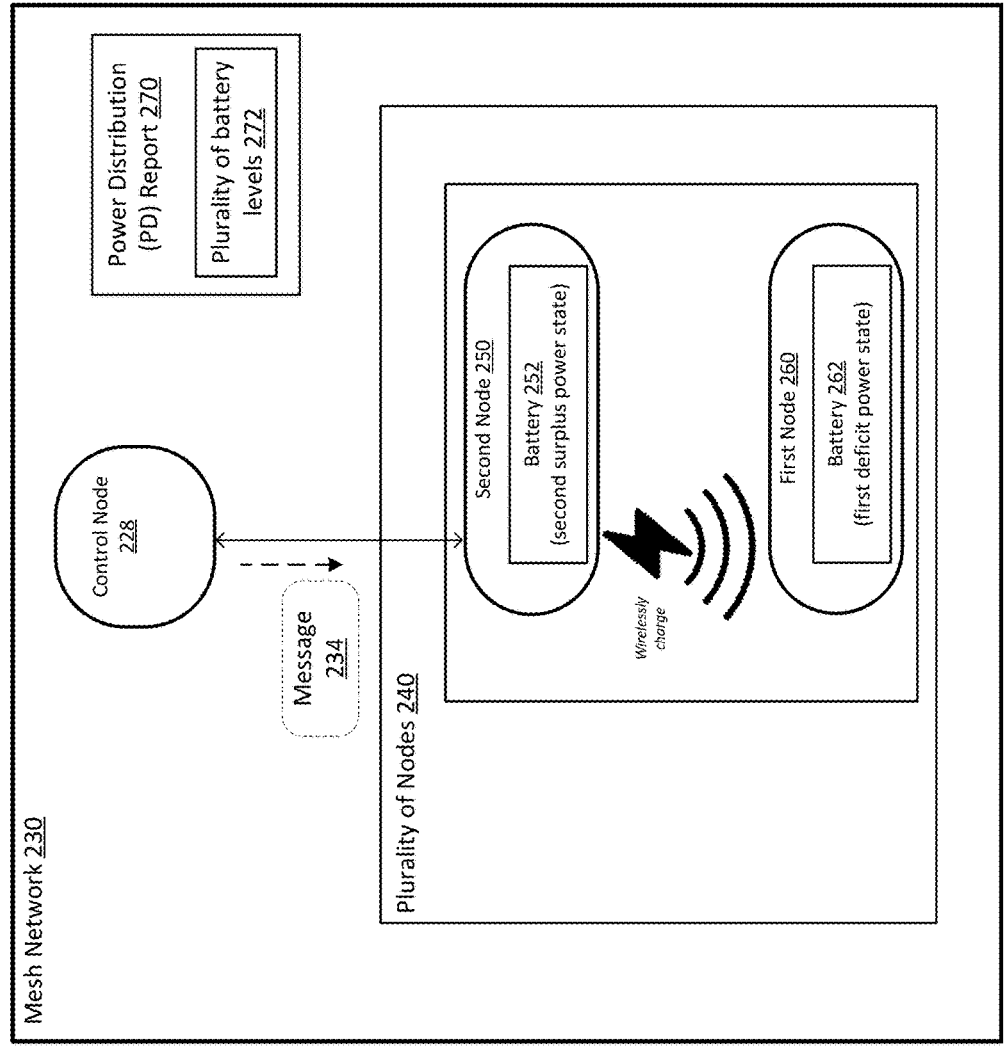
FIG. 2C is a block diagram depicting an example environment of a mesh network system 102, according to some embodiments.

FIG. 2C is a block diagram depicting an example environment of a mesh network system 102, according to some embodiments. The environment 200c includes mesh network (e.g., mesh network system 102 in FIG. 1). The mesh network system 102 includes a control node 228 (e.g., control mesh node 1008 in FIG. 1) and a plurality of mesh nodes (shown in FIG. 2C as, plurality of nodes 240"). The plurality of nodes 240 includes a first node 260 (e.g., mesh node 104d in FIG. 1) and a second node 250 (e.g., mesh node 104a in FIG. 1). The first node 260 includes a battery 262 in a first deficit power state. The second node 250 includes a battery 252 in a second surplus power state. The environment 200c includes a power distribution (PD) report 270 that includes a plurality of battery levels 272 that are associated with the plurality of nodes 240.

The control node 228 monitors the plurality of nodes 240 of the mesh network 230 to obtain the PD report 270, where the PD report includes the plurality of battery levels 272 associated with the plurality of nodes 240. The control node 228 identifies, based on the PD report 270, the first node 260 of the mesh network 230, where the battery 262 of the first node 260 is in a first deficit power state. The control node 228 identifies, based on the PD report 270, the second node 250 of the mesh network 230, where the battery 252 of the second node 250 is in a second surplus power state. The control node 228 transmits a message 234 to the second node 250 of the mesh network 230 to cause the second node 250 to wirelessly charge the battery 262 of the first node 260.

FIG. 3 is a flow diagram depicting a method for using wireless charging to redistribute power resources within a mesh network, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/ executing on a processing device), firmware (e.g., microcode), or a combination thereof. In some embodiments, method 300 may be performed by a control mesh node, such as control mesh node 108 in FIG. 1. In some embodiments, method 300 may be performed by one or more mesh node, such as mesh nodes 104 in FIG. 1. In some embodiments, method 300 may be performed by a mesh network system, such as mesh network system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of monitoring, by a processing device of a control node of a mesh network, a plurality of nodes of the mesh network to obtain a power distribution (PD) report comprising a plurality of battery levels associated with the plurality of nodes. The method 300 includes the block 304 of identifying a first node of the mesh network having a first battery in a first deficit power state based on the PD report. The method 300 includes the block 306 of identifying a second node of the mesh network having a second battery in a second surplus power state based on the PD report. The method 300 includes the block 308 of transmitting a message to the second node of the mesh network to cause the second node to wirelessly charge the first battery of the first node.

Figure 4:
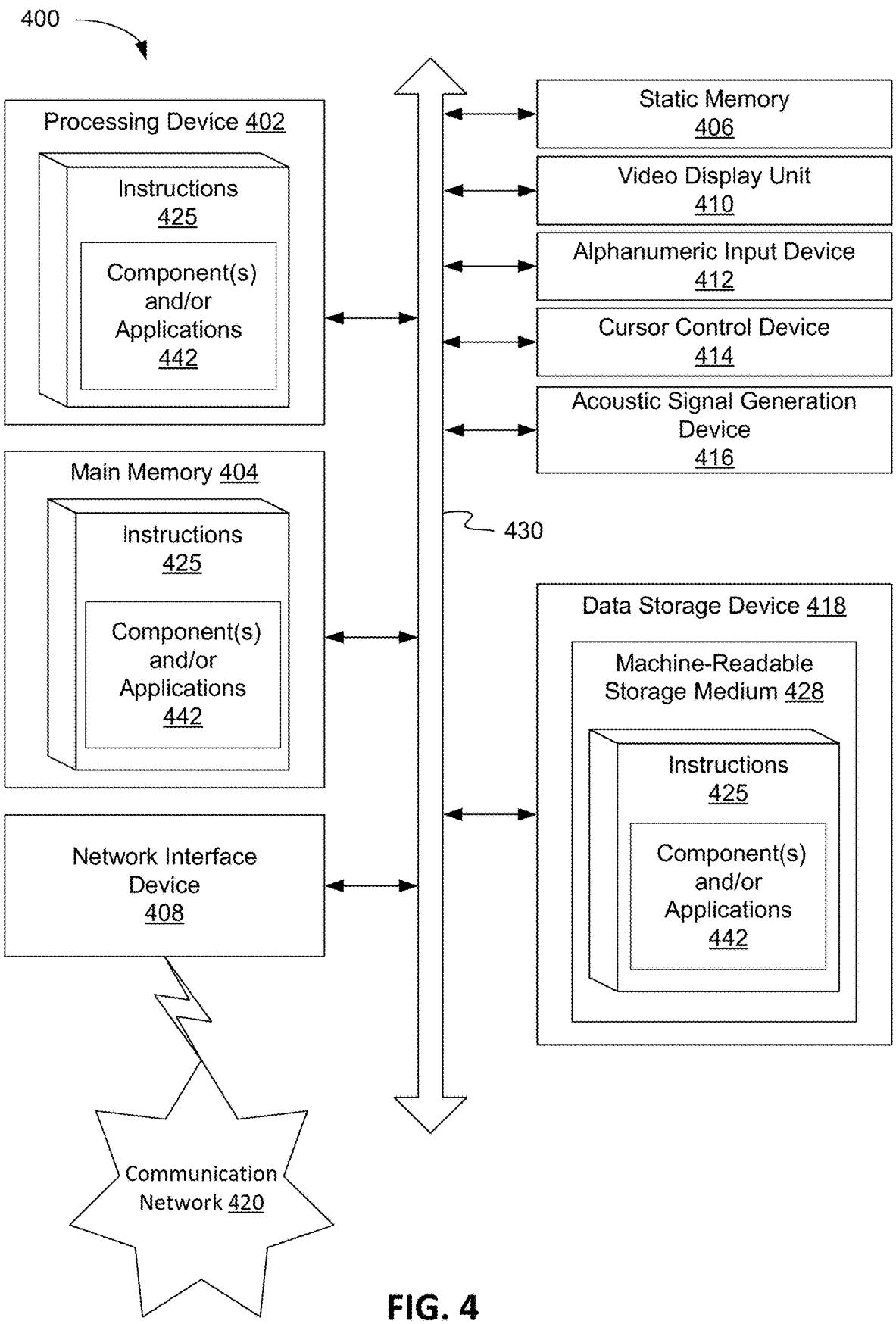
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components, agent, and/or applications 442 (e.g., PDS agent 105 in FIG. 2A, PDM agent 109 in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "monitoring," "identifying," "transmitting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method of redistributing power resources within a mesh network of nodes, the method comprising:
   monitoring, by a processing device of a control node of the mesh network, a plurality of nodes of the mesh network to obtain a power distribution (PD) report comprising a plurality of battery levels associated with the plurality of nodes;
   identifying a first node of the mesh network having a first battery in a first deficit power state based on the PD report;
   identifying a second node of the mesh network having a second battery in a second surplus power state based on the PD report;
   transmitting a message to the second node of the mesh network to cause the second node to wirelessly charge the first battery of the first node;
   determining an inability of the mesh network to resolve the first deficit power state of the first battery of the first node; and
   transmitting a distress call indicative of the inability to an egress node of the mesh network to cause the egress node to redirect the distress call to a second mesh network.

2. The method of claim 1, further comprising:
   broadcasting a request to one or more nodes of the mesh network for a node status report;
   receiving, by the control node responsive to broadcasting the request for the node status report, a first node status report associated with the first node and a second node status report associated with the second node; and
   generating the PD report based on the first node status report and the second node status report.

3. The method of claim 2, wherein broadcasting the request to the one or more nodes of the mesh network causes the first node to redirect the request for the node status report to the second node to cause the second node to send the second node status report to the first node, and redirect the second node status report to the control node.

4. The method of claim 1, wherein the PD report comprises a plurality of node identifiers and a plurality of rules, each node identifier of the plurality of node identifiers is associated with a battery level of the plurality of battery levels and one or more rules of the plurality of rules, each rule of the plurality of rules defines whether a battery is in a deficit power state or a surplus power state.

5. The method of claim 4, further comprising:
extracting, by the control node from the PD report, a first battery level associated with the first node;
extracting, by the control node from the PD report, a first predetermined value indicating when the first battery of the first node is in the first deficit power state, and
determining that the battery level of the first node is below the first predetermined value.

6. The method of claim 1, further comprising:
identifying one or more neighboring nodes of the first node that are each within a minimum distance of the first node to wirelessly charge the first battery of the first node; and
selecting, by the control node based on the PD report, the second node from the one or more neighboring nodes to wirelessly charge the first battery of the first node.

7. The method of claim 6, wherein the one or more neighboring nodes comprise a third node having a third battery in a third surplus power state, and further comprising:
calculating a second amount of surplus power of the second battery of the second node based on a battery level of the second node and a second predetermined value indicating when the second battery of the second node is in the second surplus power state;
calculating a third amount of surplus power of the third battery of the third node based on a battery level of the third node and a third predetermined value indicating when the third battery of the third node is in the third surplus power state; and
determining that the second amount of surplus power of the second battery of the second node is greater than the third amount of surplus power of the third battery of the third node.

8. The method of claim 7, further comprising:
calculating a first amount of deficit power of the first battery of the first node based on a battery level of the first node and a first predetermined value indicating when the first battery of the first node is in the first deficit power state; and
determining that the second amount of surplus power of the second battery of the second node is less than the first amount of deficit power of the first battery of the first node.

9. The method of claim 8, further comprising:
preventing, by the control node responsive to determining that the second amount of surplus power of the second battery of the second node is less than the first amount of deficit power of the first battery of the first node, the second node from entering a second deficit power state as a result of wirelessly charging the first battery of the first node; and
transmitting a different message to the third node of the mesh network to cause the third node to wirelessly charge the first battery of the first node.

10. The method of claim 8, further comprising:
determining that a rule in the PD report prohibits the second node from wirelessly charging the first battery of the first node using an amount of charging power that exceeds the second amount of surplus power of the second battery of the second node;
determining that a first device type identifier of the first node has a higher priority than a second device type identifier of the second node; and overriding the rule in the PD report by instructing the second node to wirelessly charge the first battery of the first node using the amount of charging power that exceeds the second amount of surplus power of the second battery of the second node.

11. A mesh network system, comprising:
a plurality of computing devices, wherein each computing device corresponds to a respective node of a plurality of nodes of the mesh network system, each computing device comprises a processing device,
wherein the processing device of a control node of the plurality of nodes to:
monitor the plurality of nodes of the mesh network to obtain a power distribution (PD) report comprising a plurality of battery levels associated with the plurality of nodes;
identify a first node of the mesh network having a first battery in a first deficit power state based on the PD report;
identify a second node of the mesh network having a second battery in a second surplus power state based on the PD report;
transmit a message to the second node of the mesh network to cause the second node to wirelessly charge the first battery of the first node;
determining an inability of the mesh network to resolve the first deficit power state of the first battery of the first node; and
transmitting a distress call indicative of the inability to an egress node of the mesh network to cause the egress node to redirect the distress call to a second mesh network.

12. The mesh network system of claim 11, wherein the processing device of the control node to:
broadcast a request to one or more nodes of the mesh network for a node status report;
receive, responsive to broadcasting the request for the node status report, a first node status report associated with the first node and a second node status report associated with the second node; and
generate the PD report based on the first node status report and the second node status report.

13. The mesh network system of claim 11, wherein the PD report comprises a plurality of node identifiers and a plurality of rules, each node identifier of the plurality of node identifiers is associated with a battery level of the plurality of battery levels and one or more rules of the plurality of rules, each rule of the plurality of rules defines whether a battery is in a deficit power state or a surplus power state.

14. The mesh network system of claim 13, wherein the processing device of the control node to:
extract, from the PD report, a first battery level associated with the first node;
extract, from the PD report, a first predetermined value indicating when the first battery of the first node is in the first deficit power state, and
determine that the battery level of the first node is below the first predetermined value.

15. The mesh network system of claim 11, wherein the processing device of the control node to:
identify one or more neighboring nodes of the first node that are each within a minimum distance of the first node to wirelessly charge the first battery of the first node; and
select, based on the PD report, the second node from the one or more neighboring nodes to wirelessly charge the first battery of the first node.

16. The mesh network system of claim 15, wherein the one or more neighboring nodes comprise a third node having a third battery in a third surplus power state, and wherein the processing device of the control node to:

calculate a second amount of surplus power of the second battery of the second node based on a battery level of the second node and a second predetermined value indicating when the second battery of the second node is in the second surplus power state;

calculate a third amount of surplus power of the third battery of the third node based on a battery level of the third node and a third predetermined value indicating when the third battery of the third node is in the third surplus power state; and determine that the second amount of surplus power of the second battery of the second node is greater than the third amount of surplus power of the third battery of the third node.

17. The mesh network system of claim 16, wherein the processing device of the control node to:

calculate a first amount of deficit power of the first battery of the first node based on a battery level of the first node and a first predetermined value indicating when the first battery of the first node is in the first deficit power state.

18. The mesh network system of claim 17, wherein the processing device of the control node to:

determine that the second amount of surplus power of the second battery of the second node is less than the first amount of deficit power of the first battery of the first node; and either:

prevent the second node from entering a second deficit power state as a result of wirelessly charging the first battery of the first node, and transmit, a different message to the third node of the mesh network to cause the third node to wirelessly charge the first battery of the first node; or determine that a rule in the PD report prohibits the second node from wirelessly charging the first battery of the first node using an amount of charging power that exceeds the second amount of surplus power of the second battery of the second node, determine that a first device type identifier of the first node has a higher priority than a second device type identifier of the second node, and override the rule in the PD report by instructing the second node to wirelessly charge the first battery of the first node using the amount of charging power that exceeds the second amount of surplus power of the second battery of the second node.

19. A non-transitory computer-readable medium storing instructions that, when execute by a processing device of a target node of a mesh network system, cause the processing device to:

monitor a plurality of nodes of the mesh network to obtain a power distribution (PD) report comprising a plurality of battery levels associated with the plurality of nodes;

identify a first node of the mesh network having a first battery in a first deficit power state based on the PD report;

identify a second node of the mesh network having a second battery in a second surplus power state based on the PD report;

transmit a message to the second node of the mesh network to cause the second node to wirelessly charge the first battery of the first node;

determine an inability of the mesh network to resolve the first deficit power state of the first battery of the first node; and transmit a distress call indicative of the inability to an egress node of the mesh network to cause the egress node to redirect the distress call to a second mesh network.

* * * * *